United States Patent [19]

Morita et al.

[11] 4,321,303

[45] Mar. 23, 1982

[54] MAGNETIC POWDER FOR MAGNETIC RECORDING MEDIUM

[75] Inventors: Haruyuki Morita; Yuichi Kubota; Yasuo Imaoka, all of Tokyo, Japan

[73] Assignee: TDK Electronics Co., Ltd., Tokyo, Japan

[21] Appl. No.: 173,618

[22] Filed: Jul. 30, 1980

[30] Foreign Application Priority Data

Aug. 11, 1979 [JP]   Japan ................................ 54-102640

[51] Int. Cl.³ ............................................ C01G 49/08
[52] U.S. Cl. ................................ 428/404; 252/62.56; 252/62.59; 252/62.55; 427/127; 427/130; 427/131; 428/692
[58] Field of Search ............... 252/62.55, 62.56, 62.59; 427/127, 219, 130, 131; 428/404

[56] References Cited

U.S. PATENT DOCUMENTS

| | | | |
|---|---|---|---|
| 3,725,126 | 4/1973 | Haller et al. ................. | 252/62.56 X |
| 3,947,502 | 3/1976 | Leitner et al. ............... | 252/62.59 X |
| 4,064,292 | 12/1977 | Schoenafmyer et al. ...... | 427/127 X |
| 4,071,610 | 1/1978 | Koester et al. .............. | 252/62.56 X |
| 4,137,342 | 1/1979 | Kanten ......................... | 252/62.56 X |

*Primary Examiner*—Jack Cooper
*Attorney, Agent, or Firm*—Oblon, Fisher, Spivak, McClelland & Maier

[57] ABSTRACT

A magnetic powder for a magnetic recording medium is obtained by forming a silica layer on a surface of an acicular iron oxide fine powder as a core by treating it with a silicon compound before preparing a cobalt modified acicular iron oxide fine powder by dispersing said acicular iron oxide fine powder as the core in an aqueous solution of ammonia containing cobalt ion and treating it in an inert gas atmosphere at high temperature or in a reduction atmosphere.

3 Claims, No Drawings

MAGNETIC POWDER FOR MAGNETIC RECORDING MEDIUM

BACKGROUND OF THE INVENTION

1. FIeld of the Invention

The present invention relates to a magnetic powder for a magnetic recording medium having improved magnetic characteristics.

2. Description of the Prior Arts

Acicular iron oxide powders have been mainly produced as a magnetic powder for a magnetic recording medium.

Home video tape recorders (VTR) have been developed and high quality audio cassette tapes have been commerciallized. Density of recorded signal required for a magnetic recording medium has been increased. Such high density of the magnetic recording could not be attained by using the conventional acicular iron oxide. Various magnetic powders having high coercive force and high magnetic flux density have been developed.

A magnetic powder having high coercive force having improved crystalline magnetic anisotropy obtained by coating a solid solution of cobalt component on the acicular magnetic iron oxide powder has been studied as one of the improved magnetic powders. The magnetic powder has, however, disadvantages of high temperature dependency of magnetic characteristics and high demagnetization under pressure and high demagnetization by reproducing in repeated running in a tape and large printing effect. Therefore, it has not been practically used.

SUMMARY OF THE INVENTION

It is an object of the present invention to provide a magnetic powder made of a stable cobalt modified magnetic iron oxide which has not the disadvantages of the conventional magnetic iron oxide coated with cobalt solid solution.

It is another object of the present invention to provide a magnetic powder for a magnetic recording medium having excellent less temperature dependency of coercive force and excellent printing effect and less demagnetization by reproducing.

The foregoing and other objects of the present invention have been attained by providing a magnetic powder for a magnetic recording medium obtained by forming a silica layer on a surface of an acicular iron oxide fine powder as a core by treating it with a silicon compound, if necessary heat-shrinking the powder before preparing a cobalt modified acicular iron oxide fine powder by dispersing said acicular iron oxide fine powder as the core in an aqueous solution of ammonia containing cobalt ion and treating it in an inert gas atmosphere at high temperature or in a reduction atmosphere.

DETAILED DESCRIPTION OF THE PREFERRED EMBODIMENTS

In the above-mentioned structure, the silica layer formed on the acicular iron oxide fine powder as the core prevents penetration of cobalt ion into the cores as a barrier whereby a cobalt modified acicular iron oxide having high coercive force and high magnetic flux density and excellent thermal stability can be obtained though such magnetic characteristics could not be attained by the conventional acicular iron oxide powder.

When the acicular iron oxide powder having the silica layer is heat-shrinked at a suitable temperature such as higher than 400° C., the barrier is to be strengthened to obtain a cobalt modified magnetic iron oxide having further improved thermal stability.

The acicular iron oxides used as the core can include hydrate type and can be $\alpha$-FeOOH, $\beta$-FeOOH, $\gamma$-FeOOH, $\alpha$-Fe$_2$O$_3$, $\gamma$-Fe$_2$O$_3$ and Fe$_3$O$_4$.

The formation of a silica layer on the surface of Fe$_3$O$_4$ as the core will be illustrated.

$\alpha$-FeOOH is dispersed into a deionized water and a desired amount of colloidal silica is added and the mixture is thoroughly stirred and filtered and dried by the same manner.

The resulting silica-coated FeOOH is dehydrated and reduced to obtain a silica-coated powder of Fe$_3$O$_4$. The same effect can be attained by replacing the colloidal silica to a water glass or various silane coupling agent, in said step.

Instead of the process for using $\alpha$-FeOOH, it is possible to obtain a silica coated powder of Fe$_3$O$_4$ by forming a silica layer on the surface of powder of $\gamma$-Fe$_2$O$_3$ or $\alpha$-Fe$_2$O$_3$ and reducing it or it is also possible to form directly a silica layer on the powder of Fe$_3$O$_4$.

The process for heat-shrinking at higher than 400° C. after forming a silica layer will be illustrated.

Fine pores are usually formed in the powder of Fe$_3$O$_4$ obtained by dehydrating and reducing $\alpha$-FeOOH. The fine pores adversely affect the magnetic characteristics and magnetic poles are formed around the fine pores which attract the other powder of Fe$_3$O$_4$ whereby the dispersibility is deteriorated. Therefore, it is preferable to eliminate the fine pores in the powder as much as possible.

In the present invention, the powder of Fe$_3$O$_4$ having silica layer is heat-shrinked in nitrogen atmosphere at higher than 400° C. to eliminate the fine pores whereby the magnetic characteristics and the dispersibility are improved.

Even though it is heat-treated in nitrogen atmosphere for long time, if the temperature is lower than 400° C., the fine pores in the powder of Fe$_3$O$_4$ are not decreased. When it is heat-shrinked in nitrogen atmosphere at about 400° to 800° C., the fine pores in the powder are eliminated for a time of 1 to 6 hours. In said range of the temperature, longer time for the heat treatment is required depending upon lower temperature. When the baking is carried out at higher than 800° C., sintering between particles is partially formed and the powder is partially converted into $\alpha$-Fe$_2$O$_3$. This is disadvantageous.

Beside the above-mentioned heat-shrinking process, the same effect can be attained by heat-shrinking a powder of $\alpha$-Fe$_2$O$_3$ at higher than 400° C. after forming the silica layer and then reducing it to obtain the powder of Fe$_3$O$_4$.

When the acicular iron oxide obtained by heat-shrinking the powder at higher than 400° C. to eliminate fine pores after forming the silica layer is used as the core and the cobalt deposition on the treated acicular iron oxide is carried out, the barrier for preventing the penetration of cobalt component is further strengthened in comparison with that of the conventional acicular iron oxide powder as the core. The penetration of the cobalt component into the core can be lowered.

The cobalt deposition, especially, the process for depositing the cobalt component in hydrogen atmosphere will be further illustrated.

A cobalt salt is dissolved into a deionized water and ammonia water is added to maintain pH of about 12. The silica coated iron oxide as the core is dispersed in this solution of the cobalt component. Then, the dispersion is charged in an autoclave and hydrogen is fed under a desired pressure and the autoclave is heated in an electric furnace to maintain high temperature and high pressure. By the operation, the cobalt component is solidified on the surface of the powder as the core. After the reaction, the product is discharged and filtered and washed with water and dried to obtain the cobalt modified magnetic iron oxide powder.

The present invention will be further illustrated by certain examples and references which are provided for purposes of illustration only and are not intended to be limiting the present invention.

EXAMPLE 1

In a mixture, 1 kg. of $\alpha$-FeOOH (major axis of about 0.5$\mu$ and acicular ratio of 7) was added into 10 l. of deionized water and the mixture was stirred for 60 minutes to prepare a slurry. In the mixer, 200 ml. of a colloidal silica dispersion ($SiO_2$: 20%) was added into the slurry and stirred for 60 min. The mixture was filtered and the solid component was dried to obtain $\alpha$-FeOOH coated with silica.. The resulting $\alpha$-FeOOH coated with silica was dehydrated at 250° C. in air and reduced at 350° C. in hydrogen atmosphere to obtain $Fe_3O_4$ coated with silica. (This is referred as M-1.)

In the other mixer, 214 g. of $CoSO_3.7H_2O$ (special grade) was dissolved into 4 l. of deionized water and then, 3.3 l. of 8N-ammonia water (first grade) was added and thoroughly stirred and then, 750 g. of $Fe_3O_4$ coated with silica (M-1) was added as cores and the mixture was stirred for about 60 min. in the mixer. After the mixing, the mixture was charged into a 10 l. stainless steel autoclave and the autoclave was degased by a vacuum pump and then hydrogen gas was fed to 50 atm. The autoclave was heated by an electric furnace to maintain at 150° C. for 4 hr. After the reaction, the autoclave was cooled and the reaction product was discharged from the autoclave. The powdery product was separated by filtration and washed and dried at 50° C. under a reduced pressure. The resulting reaction product was black acicular powder. The magnetic characteristic of the product was as follows.

Hc = 680 Oe; $\sigma_s$ = 82.9 emu/g.

(This is referred as S-1.)

EXAMPLE 2

The $Fe_3O_4$ coated with silica (M-1) obtained in Example 1 was heat-shrinked at 500° C. for 1 hr. in nitrogen atmosphere to eliminate fine pores in the powder. (This is referred as M-2.)

In accordance with the cobalt solidification of Example 1, 750 g. of the $Fe_3O_4$ coated with silica (M-2) was treated to obtain a reaction product. (This is referred as S-2.) The magnetic characteristic of the product was as follows.

Hc = 580 Oe; $\sigma_s$ = 83.0 emu/g.

EXAMPLE 3

In a mixer, 214 g. of $CoSO_4.7H_2O$ (special grade) was dissolved in 4 l. of deionized water and then, 3.3 l. of 8N-ammonia water was added and stirred and then, 750 g. of the product (M-2) was added as cores and the mixture was stirred for 60 minutes. The mixture was charged in an autoclave and the autoclave was degased by a vacuum pump and then nitrogen gas was fed to 20 atm. The reaction was carried out in the condition of Example 1 to obtain a reaction product. (This is referred as S-3.) The magnetic characteristic of the product (S-3) was as follows.

Hc = 830 Oe; $\sigma_s$ = 80.5 emu/g.

REFERENCE

The $\alpha$-FeOOH as the starting material in Example 1 (before coating with silica) was dehydrated at 250° C. in air and reduced at 350° C. in hydrogen atmosphere to obtain $Fe_3O_4$. (This is referred as M-3.)

In accordance with the cobalt deposition of Example 1, 750 g. of the product (M-3) was treated to obtain a reaction product. (This is referred as S-4.) The magnetic characteristic of the product was as follows.

Hc = 1120 Oe; $\sigma_s$ = 81.3 emu/g.

The magnetic powders of the present invention and the reference have been described in detail by the examples and reference.

Each magnetic composition having the following formula was prepared by using each of the magnetic powders (S-1) to (S-4) obtained in Examples 1, 2 and 3 and Reference. The magnetic composition was coated on a polyethyleneterephthalate film to prepare a magnetic tape.

Magnetic powder: 120 wt. parts
Vinyl chloride-vinyl acetate copolymer: 30 wt. parts
Polyurethane resin: 10 wt. parts
Carbon black: 10 wt. parts
Surfactant: 1.5 wt. parts
Methyl ethyl ketone: 150 wt. parts
Methyl isobutyl ketone: 150 wt. parts
Lubricant: 3 wt. parts The components were kneaded in a ball mill for 48 hr. The resulting composition was coated on a polyethyleneterephthalate film and treated to obtain each magnetic tape for a compact cassette C-90.

The magnetic characteristics of the magnetic tapes were as follows.

TABLE 1

| Magnetic powder | S-1 | S-2 | S-3 | S-4 |
|---|---|---|---|---|
| Maximum magnetic flux density Bm (Gauss) | 1,530 | 1,590 | 1,510 | 1,490 |
| Hc (60° C.)/Hc (25° C.) | 0.92 | 0.93 | 0.90 | 0.84 |
| Printing effect (dB) | 54.0 | 55.7 | 53.2 | 49.0 |
| Reproduction demagnetization (dB) | −1.5 | −1.2 | −1.6 | −2.5 |
| Thickness of coated layer ($\mu$) | 5.7 | 5.1 | 5.4 | 5.1 |

The effect by the printing was measured by recording a signal having 1 KHz on the magnetic tape at a speed of 4.75 cm/sec. and maintaining the magnetic tape in an atmosphere at 30° C. for 24 hr. before the measurement.

The demagnetization by the reproducing was measured by recording a signal having 8 KHz on the magnetic tape and running the tape for 300 times.

As it is clear from Table 1, the magnetic tapes prepared by using the magnetic powder (S-1), (S-2) or (S-3) of the present invention had the magnetic characteristics superior to the magnetic tape using the magnetic powder (S-4) in which the solid solution of a part of the cobalt component was formed. The value Hc(60°

C.)/Hc(25° C.) for temperature dependency of coercive force, the effect by printing and the demagnetization by reproducing were especially improved.

This phenomenon is considered as follows.

When the cobalt component is deposited on the acicular iron oxide powder coated with silica or the acicular iron oxide heat-shrinked after coating with silica, the cobalt component is not doped into the acicular iron oxide as cores but is coated on the surface of the cores, whereby the magnetic characteristics are thermally stabilized.

The magnetic tape prepared by using the magnetic powder (S-2) obtained by heat-shrinking after coating silica had the magnetic characteristic superior to the magnetic tapes prepared by using the magnetic powder (S-1) or (S-3) obtained without baking for high density.

This phenomenon is considered as follows.

The fine pores of the $Fe_3O_4$ powder were eliminated by the heat-shrinking whereby the barrier for preventing the doping of the cobalt component into the cores is further strengthen.

As described above, the magnetic powder for the magnetic recording medium of the present invention is produced by dispersing the acicular iron oxide powder as cores into an aqueous solution of ammonia containing cobalt ion and producing the cobalt modified magnetic iron oxide powder from the dispersion, in the inert gas atmosphere at high temperature or in the reduction atmosphere wherein the surface of the acicular iron oxide powder is treated with a silicon compound to form a silica coated layer, if necessary, the product is heat-shrinked after forming the silica coated layer. Therefore, the silica layer on the surface of the acicular iron oxide powder as cores imparts effect of a barrier for preventing the penetration of cobalt component into the cores thereby forming the cobalt modified acicular iron oxide which has high coercive force and high magnetic flux density and is thermally stable which could not be attained by the conventional acicular iron oxide. The magnetic recording medium having excellent magnetic characteristics can be obtained by using the same.

We claim:

1. A magnetic powder for a magnetic recording medium which is obtained by: forming a silica layer on the surface of an acicular iron oxide fine powder selected from the group consisting of $\alpha$-FeOOH, $\beta$-FeOOH, $\gamma$-FeOOH, $\alpha$-Fe$_2$O$_3$, $\gamma$-Fe$_2$O$_3$ and Fe$_3$O$_4$ as a core; if the acicular iron oxide powder is selected from the group consisting of $\alpha$-FeOOH, $\beta$-FeOOH and $\gamma$-FeOOH, dehydrating and reducing the same to obtain a silica-coated powder of $Fe_3O_4$; if the acicular iron oxide powder is selected from the group consisting of $\alpha$-Fe$_2$O$_3$ and $\gamma$-Fe$_2$O$_3$, reducing the same to obtain a silica-coated powder of $Fe_3O_4$; dispersing said silica-coated powder of $Fe_3O_4$ in an aqueous solution of ammonia containing cobalt ion and heating the same in an inert gas atmosphere or in a reducing gas atmosphere to deposit cobalt on said silica-coated $Fe_3O_4$; and recovering the cobalt-modified powder.

2. The magnetic powder for a magnetic recording medium according to claim 1, wherein, prior to dispersion of said silica-coated $Fe_3O_4$ in said aqueous solution of ammonia containing cobalt ion, said silica-coated $Fe_3O_4$ is heated in a nitrogen atmosphere at 400°–800° C. for 1 to 6 hours.

3. The magnetic powder for a magnetic recording medium according to claim 1, wherein, if the acicular iron oxide powder is $\alpha$-Fe$_2$O$_3$, prior to the step of reducing the same to obtain a silica-coated powder of $Fe_3O_4$, heating the same in a nitrogen atmosphere at 400°–800° C. for 1 to 6 hours.

* * * * *